(12) United States Patent
Chen

(10) Patent No.: US 10,404,767 B2
(45) Date of Patent: *Sep. 3, 2019

(54) SYSTEMS AND METHODS FOR STREAMING CONTENT TO NEARBY DISPLAYS

(71) Applicant: Disney Enterprises, Inc., Burbank, CA (US)

(72) Inventor: Alexander C. Chen, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/784,055

(22) Filed: Oct. 13, 2017

(65) Prior Publication Data

US 2018/0041559 A1 Feb. 8, 2018

Related U.S. Application Data

(63) Continuation of application No. 14/696,323, filed on Apr. 24, 2015, now Pat. No. 9,848,027.

(51) Int. Cl.
*H04W 4/02* (2018.01)
*H04L 29/06* (2006.01)
(Continued)

(52) U.S. Cl.
CPC .......... *H04L 65/60* (2013.01); *H04M 1/7253* (2013.01); *H04W 4/023* (2013.01); *H04W 4/025* (2013.01);
(Continued)

(58) Field of Classification Search
CPC . G06F 17/3082; G06F 21/10; G06Q 30/0251; H04L 63/08; H04L 65/60; H04L 67/02; H04L 67/10; H04N 21/43615; H04N 7/142; H04W 4/021; H04W 4/023; H04W 4/025; H04W 4/027; H04W 4/04; H04W 4/008; H04M 1/7253
See application file for complete search history.

(56) References Cited

U.S. PATENT DOCUMENTS 8,479,250 B2 7/2013 Barry
8,516,533 B2 8/2013 Davis et al.
(Continued)

OTHER PUBLICATIONS

Davies et al., "Pervasive Displays—Understanding the Future of Digital Signage", Retrieved from the Internet: http://www.morganclaypool.com/doi/suppl/10.2200/S00558ED1V01Y201312MPC011/suppl_file/Davies_Ch1.pdf, p. 1-19, 2014.

(Continued)

*Primary Examiner* — Le H Luu
(74) *Attorney, Agent, or Firm* — Sheppard Mullin Richter & Hampton LLP

(57) ABSTRACT

The present disclosure provides systems and methods for a mobile device to select content, such as user profiles, contact information, images, and/or videos, to automatically stream to available displays when the mobile device moves within a certain range of the displays. In one embodiment, a method at a mobile device comprises receiving a user input to select a media content asset; detecting a display within a proximity of the mobile device; and sending the selected media content asset to the display without requiring additional user input.

20 Claims, 9 Drawing Sheets

(51) Int. Cl.
  *H04W 4/04* (2009.01)
  *H04W 12/08* (2009.01)
  *H04M 1/725* (2006.01)
  *H04W 4/80* (2018.01)

(52) U.S. Cl.
  CPC .............. *H04W 4/027* (2013.01); *H04W 4/04* (2013.01); *H04W 4/80* (2018.02); *H04W 12/08* (2013.01)

(56) References Cited

U.S. PATENT DOCUMENTS

| | | | |
|---|---|---|---|
| 8,666,308 B2 | 3/2014 | Slotznick | |
| 8,965,314 B2 | 2/2015 | Jeong | |
| 2007/0024580 A1 | 2/2007 | Sands et al. | |
| 2008/0168129 A1* | 7/2008 | Robbin | H04L 65/60 709/203 |
| 2011/0093337 A1* | 4/2011 | Granit | G06Q 30/0251 705/14.53 |
| 2012/0166655 A1 | 6/2012 | Maddali et al. | |
| 2013/0014171 A1* | 1/2013 | Sansom | G06F 17/3082 725/52 |
| 2013/0262582 A1 | 10/2013 | Houjou | |
| 2014/0154983 A1 | 6/2014 | Schultz et al. | |
| 2014/0258405 A1* | 9/2014 | Perkin | H04W 4/021 709/204 |
| 2014/0258552 A1 | 9/2014 | Oyman et al. | |
| 2014/0280762 A1* | 9/2014 | Rothschild | H04L 67/02 709/219 |
| 2014/0282963 A1* | 9/2014 | Wildermuth | H04L 63/08 726/7 |
| 2015/0074748 A1* | 3/2015 | Brock | G06F 21/10 726/1 |
| 2015/0121541 A1* | 4/2015 | Fay | G06F 21/10 726/27 |
| 2015/0312622 A1* | 10/2015 | Candelore | H04N 21/43615 725/37 |
| 2016/0182613 A1* | 6/2016 | Brune | H04L 67/10 709/217 |
| 2016/0277708 A1* | 9/2016 | Rintel | H04N 7/142 |
| 2016/0345039 A1* | 11/2016 | Billmeyer | G06F 21/10 |

OTHER PUBLICATIONS

ASUS, "ASUS launches O!Play Mini Plus Smart TV Set-Top Box", Retrieved from the Internet: http://www.asus.com/News/L0I7vmSzgc0SSdnF, pp. 1-3, Aug. 29, 2011.

* cited by examiner

SYSTEMS AND METHODS FOR STREAMING CONTENT TO NEARBY DISPLAYS

CROSS-REFERENCE TO RELATED APPLICATIONS

This application is a continuation application of U.S. patent application Ser. No. 14/696,323, filed Apr. 24, 2015, the content of which is incorporated herein in its entirety.

TECHNICAL FIELD

The present disclosure relates generally to streaming media content, and more particularly to systems and methods for streaming content to nearby displays.

SUMMARY OF THE INVENTION

The present disclosure may be embodied in a method at a mobile device, the method comprising: receiving a user input to select a media content asset; detecting a display within a proximity of the mobile device; and sending the selected media content asset to the display without requiring additional user input.

In one aspect of this embodiment, the method may further comprise sending a search signal to determine whether there is a display within the proximity of the mobile device. In a more particular aspect, the search signal may be sent as a result of detecting that the mobile device is moving. In another aspect, the search signal may be sent as a result of detecting that the mobile device has stopped moving for a period of time.

In another aspect of this embodiment, the method may further comprise receiving a rule for sending user-selected content to a display within the proximity of the mobile device.

The rule may comprise a time-based rule for when content may be sent to a display within the proximity of the mobile device. The time-based rule may permit sending a first set of media content assets during a first time period, and may permit sending of a second set of media content assets during a second time period.

The rule may comprise a location-based rule for where content may be sent to a display within the proximity of the mobile device. The location-based rule may permit sending a first set of media content assets at a first location, and may permit sending a second set of media content assets at a second location.

The rule may comprise a maximum display distance, such that only displays within the maximum display distance from the mobile device can be sent the selected media content asset.

In another aspect of this embodiment, the method may further comprise receiving a display rule from the display. The display rule may comprise a content restriction rule, and the method may further comprise determining whether the selected media content asset satisfies the content restriction rule.

In yet another aspect of this embodiment, the method may further comprise detecting a second display; and sending at least a portion of the selected media content asset to the second display. The same media content asset may be sent to both the display and the second display. Sending the media content asset to both the display and the second display may further comprise streaming the media content asset such that the display and the second display act as a single, connected display.

In a particular aspect of this embodiment, the media content asset may be selected from a digital media library associated with the user.

In yet another aspect of this embodiment, the method may further comprise receiving a user input to control an audio signal of the selected media content asset when the asset is played on the display.

The present disclosure may also be embodied by a method at a display, the method comprising: detecting a mobile device within a proximity of the display; receiving a media content asset from the mobile device; displaying the media content asset on the display; and ceasing display of the media content asset when the mobile device has moved out of the proximity.

In one aspect of this embodiment, the method may further comprise sending a search signal to determine whether there is a mobile device within a proximity of the display.

In another aspect of this embodiment, the method may further comprise receiving a display rule. The display rule may comprise a content restriction that limits a media content asset that may be displayed on the display. In this aspect, the method may further comprise checking the media content asset for compliance with the content restriction, wherein displaying the media content asset on the display occurs only if the media content asset complies with the content restriction. The display rule may also comprise a maximum mobile device distance, such that media content assets may only be received from mobile devices within the maximum mobile device distance.

In another aspect of this embodiment, the method may further comprise detecting a second mobile device within the proximity of the display; and receiving on the display a second media content asset from the second mobile device; wherein displaying the media content asset on the display comprises displaying a combination of the media content asset and the second media content asset on the display.

The present disclosure may also be embodied in non-transitory computer readable medium comprising an instruction set configured to command a computing device to carry out the methods described herein.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION

The present disclosure provides systems and methods for a mobile device to stream user-selected content, such as user profiles, contact information, images, and/or videos, to available displays when the mobile device moves within a certain range of the displays. One advantage of the disclosed systems and methods is a user can use a mobile device to select content to share with other people, activate sharing on the mobile device, and put the mobile device in a pocket or bag. The mobile device can automatically stream the user-selected content to nearby displays without user commands when the mobile device moves within a range of the displays. The user does not have to physically look for displays, or manually press buttons on the mobile device to establish a communication link between the mobile device and nearby displays. In this way, users can quickly and automatically share content in locations where it was previously difficult to do so.

Figure 1:
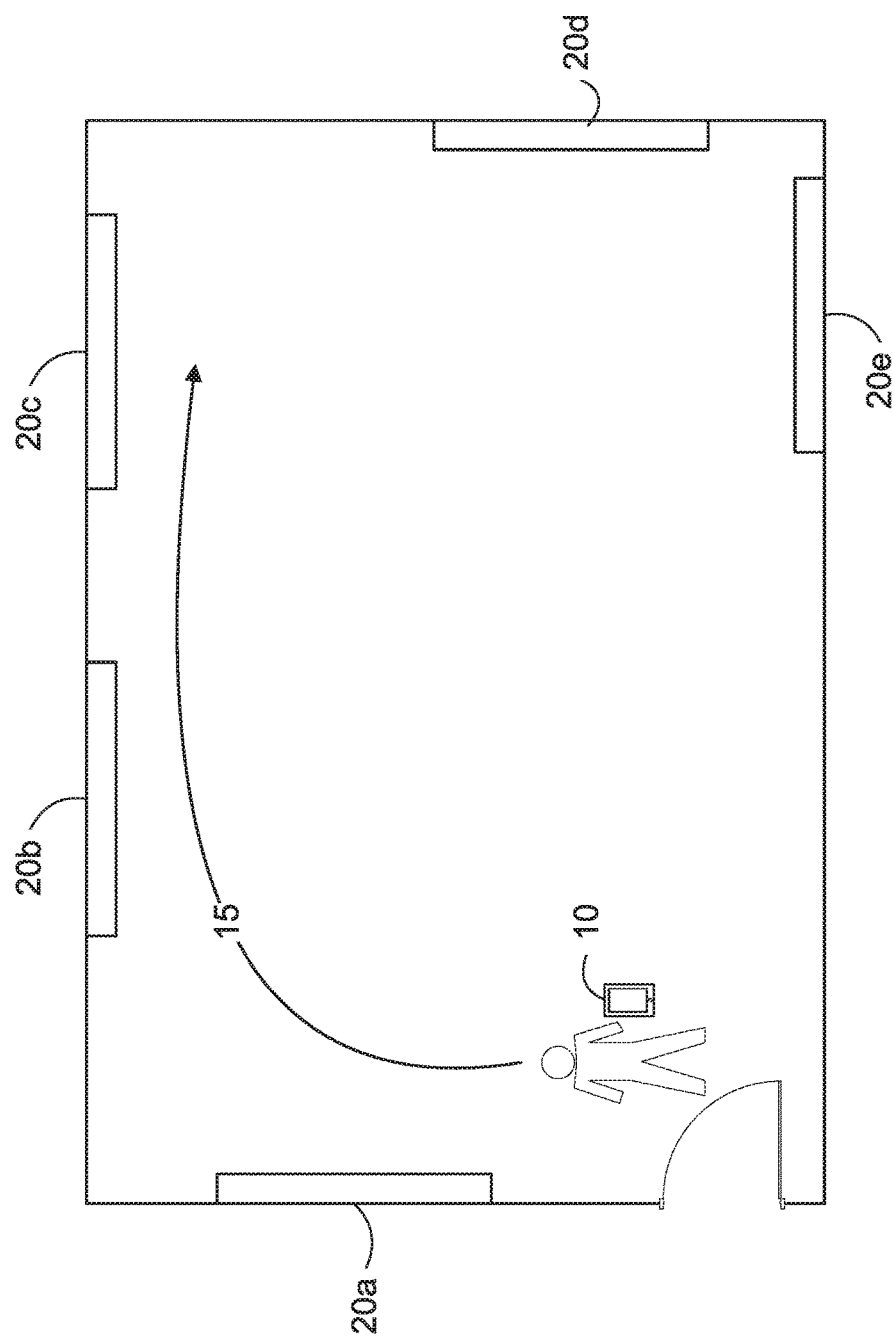
FIG. 1 provides a top plan view of an automatic video streaming system, in accordance with an embodiment of the present disclosure.

As shown in FIG. 1, in one embodiment of the disclosed systems and methods, a user may use a mobile device 10 (e.g., smartphone, tablet, laptop, watch, wristband, glasses, etc.) to automatically stream content to nearby displays 20*a*, 20*b*, 20*c* (e.g., a laptop, a tablet, a TV, a computer screen, etc.). The content may be stored locally at the mobile device 10 or stored at a remote server. As shown on the user interface 900 (such as a touchscreen) in FIG. 9, the user may use their mobile device 10 to select content (920) to automatically share on nearby displays 20*a*, 20*b*, 20*c*. The content may comprise, for example, a user profile, business contact information, content from an online social network or business network, personal media gallery, or an online digital content database. The content may comprise favorite movies, movie trailers, movie posters, movie scenes, quotes, photos, videos, music, and the like. A user may also wish to share information about his or her favorite actors/actresses, sports teams, their alma mater, favorite restaurants, hobbies, interests, etc.

Figure 9:
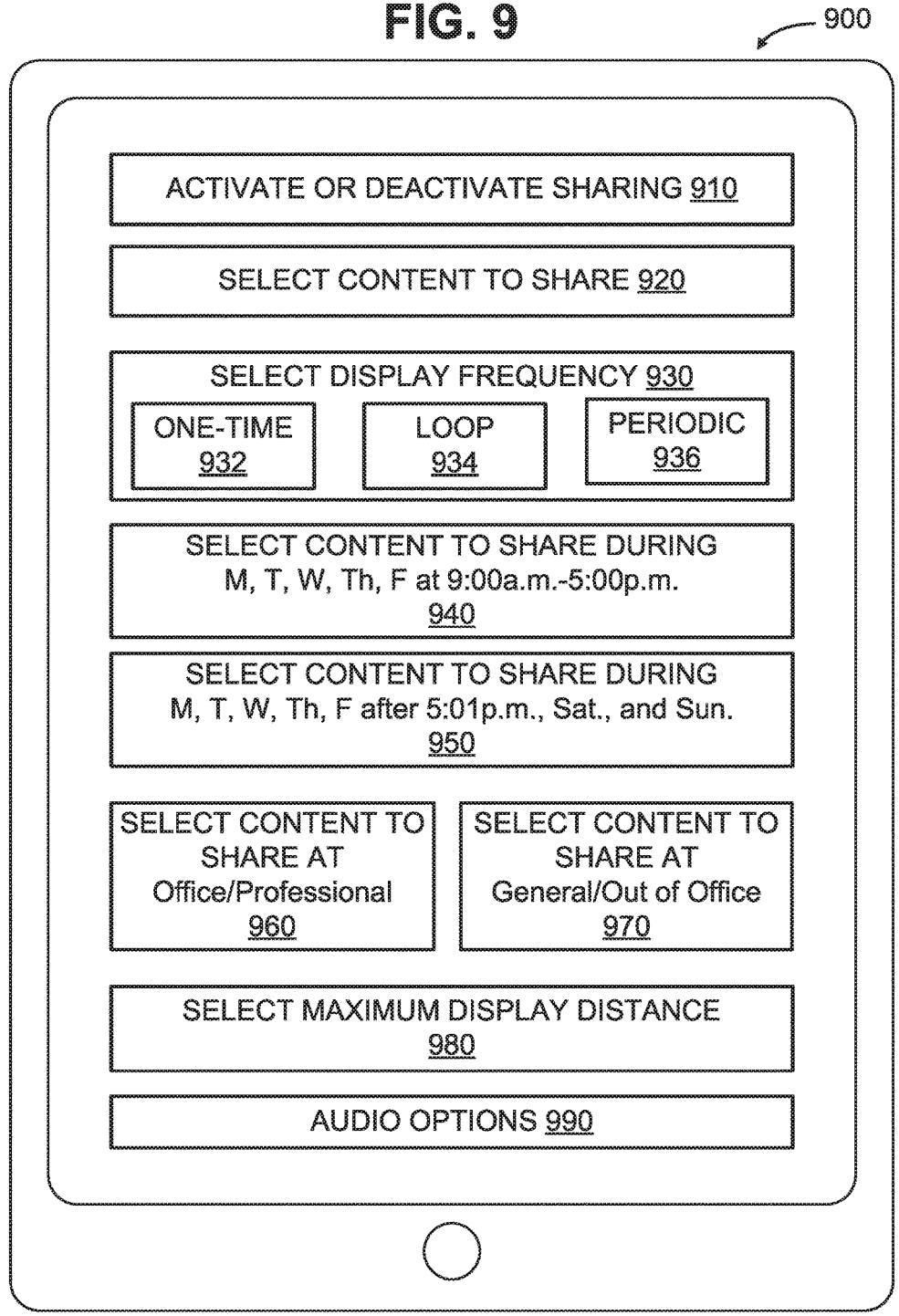
FIG. 9 illustrates an example of a user interface for one or more of the mobile devices described herein.

As shown in FIG. 9, after selecting the content (920), the user may select whether to activate or deactivate the automatic sharing feature (910), which the user may change later. Alternatively, a user may select an option to share the content during one or more periods of time (940-950), e.g., during work hours, or outside work hours. The user may set preferences such that sharing is automatic under certain pre-specified conditions based on time and/or location (940-970), e.g., during certain times of day, on particular days, at certain locations, away from certain locations, etc. The mobile device (in communication with a network) may use one or more ways to determine its own location. Alternatively, a building may have a transmitter that sends a signal to the mobile device to inform the mobile device of its location. By way of example, a user may activate sharing whenever he/she enters a restaurant establishment, but have it deactivated at all other places. Or a user may wish to deactivate sharing whenever they are at work, but have it activated at all other places; or have sharing deactivated during weekdays, and activated during weekends.

The user can also select the frequency or number of times that content will be streamed to nearby displays (930) to display, such as a one-time display (932), a loop for a video or series of images (934), a periodic display (936), e.g., once every 2 minutes, etc. Other frequencies can be selected.

In FIG. 1, a user uses a mobile device 10 to select content that he/she wishes to share (920), and enables the sharing function (910). After that, the user does not have to do anything else, such as manually look for displays, check their capability and availability to wirelessly receive content, link the mobile device 10 to a display, etc. The mobile device 10 automatically streams the user-selected content to nearby displays 20*a*-20*e* that are capable (have the proper hardware and software) and available (allowed by the display owner) to display the shared content. FIG. 1 provides an example situation of a user carrying a mobile device 10 and entering a room with five displays (20*a*-*e*). As the user walks into the room, the mobile device 10 might detect the presence of a first nearby display 20*a*. The mobile device 10 already knows what content the user wishes to share, and can automatically stream the content to the display 20*a* once the display 20*a* is detected.

In particular embodiments, the mobile device 10 may detect nearby displays by sending out a search signal for capable and available displays. Alternatively, the displays 20*a*-*e* may send out search signals looking for nearby mobile devices that are able to stream content. Alternatively, both the mobile device 10 and the displays 20*a*-*e* may send out search signals looking for nearby partnering devices. These search signals may be sent out either periodically or continuously. Search signals may also be sent out based on certain conditions detected by the mobile device 10. For example, a mobile device 10 may send out a search signal, and if the mobile device 10 detects that it has been stationary for a period of time, it will wait to send another search signal until it detects movement by a user. This is because if a first search signal did not result in detecting any nearby displays, it is unlikely that any display will be detected by another signal if the mobile device 10 has remained stationary. Once the mobile device 10 detects that the user is moving, it may send out another search signal periodically to see if the user has moved within range of any display. The mobile device 10 may also send a signal when it detects that a user was moving and then stops at a particular location, to see if there are any displays near the user's stationary position.

Alternatively, instead of sending a search signal, the mobile device may continuously or periodically send (broadcasts) content to any available display to receive.

Mobile devices, displays, and control units described herein may communicate via one or more wireless communications protocols, such as Wi-Fi, WiMAX, Bluetooth, near-field communications (NFC), cellular, or the like. In one embodiment, mobile devices and displays may communicate directly with each other. In another embodiment, the mobile devices and displays may communicate with each other through a network using a router or a base station.

As the user moves further into the room along path 15, the mobile device 10 may detect that additional displays 20*b* and 20*c* are also nearby, and begin streaming content to those displays 20*b* and 20*c* as well. The content streamed to each display may be the same, such that the displays 20*a*-*c* mirror each other, or may be different. As the user moves further into the room, the user may move out of the range of display 20*a*, such that the user's shared content stops playing on display 20*a*, but continues to play on displays 20*b-c*.

In various embodiments of the present disclosure, the automatic streaming systems may be highly customizable based on the desires of the mobile device users and display owners. For example, as discussed above, a user may customize various aspects of when the sharing function will be activated (e.g., deactivated during weekdays, activated after 7 P.M., deactivated at work, activated at restaurants/bars). Of course, a user may manually activate or deactivate the sharing function (910).

Owners of displays may also wish to limit when content is displayed on their displays, or what types of content may be displayed. For example, the owner of a sports bar may wish to have a single display at the entrance of the bar be capable and available to receive shared content. But all remaining displays in the bar may be unavailable to receive shared content, so patrons of the bar can watch sporting events without being disturbed by shared content from other patrons' mobile devices. Display owners may also wish to limit the types of content that can be streamed from user's mobile devices. The owner of a family restaurant may only permit streaming of content that has been marked as "child-friendly." Or professional environments may only permit the display of content that has been marked as business-appropriate (e.g., displaying a user's business card or employer). Further, certain content may have just a visual aspect, just an audio aspect, or both. Display owners may permit only audio, or only video elements to be displayed.

In FIG. 9, the user can also select a distance or proximity of a display (980) for the mobile device 10 to detect and begin streaming content. For example, a user may specify on his or her mobile device that content should only be shared on displays within 10 feet of the mobile device. A user's position relative to a display may be determined in a variety of ways, such as the mobile device's GPS coordinates relative to that of the display, the strength of a reply signal from a display, or the use of lasers or other forms of energy to measure distance between the mobile device and the display. Similarly, a display owner or business owner may wish to display content only from mobile devices within 15 feet of the display, or within the same room as the display.

Where the "rules" placed on a particular mobile device and a display overlap or contradict, the most restrictive rule may be applied. For example, if a user says they wish to stream content to displays within 10 feet of the mobile device, and a display owner has configured a display to display content from mobile devices within 7 feet, then the more restrictive 7 foot rule would apply. Similarly, where a user has chosen to only stream child-friendly content in public, and a public display permits streaming of any content, then the user's more restrictive child-friendly content rule would apply.

A rule consolidation procedure described above may be implemented on the mobile device, such that it is able to receive the rules/restrictions from nearby displays and consolidate them with the mobile device's own rules to determine what content should be streamed to the display. The mobile device can then transmit content that satisfies both sets of rules to the display.

Alternatively, rules consolidation may be implemented on a display, such that the display can receive a connected mobile device's rules and consolidate them with its own set of rules. The display may then request or "pull" content from the mobile device that satisfies both sets of rules, or receive all content from the mobile device and filter out inappropriate content.

Alternatively, neither device "consolidates" the other device's rules such that each device implements its own rules. In this scenario, if the mobile device transmits content that is against the display's rules, the display may reject the content and request another content, or vice versa, i.e., the display may request content and the mobile device may reject the request if it is against the rules implemented on the mobile device.

In yet another embodiment, both devices may take part in the rules consolidation process so as to "double check" each other's work. In this embodiment, the mobile device may consolidate its own rules with a connected display's rules, and transmit content to the display, while the display may do its own double-check to ensure that the content transmitted from the mobile device conforms to the display's rules.

In yet another alternative embodiment, rather than the mobile device "pushing" content to the display, the display may "pull" content from the mobile device such that the display might request that the mobile device send particular content, and the mobile device can perform the "double checking" action to ensure that the requested content conforms to the mobile device's streaming rules.

Displays may also incorporate a security or virus-detection component to ensure that streamed content displayed on the display do not have any viruses.

Based on the examples provided above, it should be clear that both the mobile device user (e.g., a content "sharer") and the display owner (e.g., a content "displayer") may customize content sharing and display to fit their individual needs.

A display may adjust its display settings (contrast, brightness, resolution, colors, High Definition (HD), High Dynamic Range (HDR), etc.) depending on a format of content received from the mobile device.

The user interface in FIG. 9 may also allow a user to select one or more audio options (990) for the displays that receive content from the mobile device 10, such as mute, reduced volume, normal volume, stereo, etc. The mobile device may send audio to more than one display to output stereo audio, 5.1, 7.1 or other format.

Figure 2:
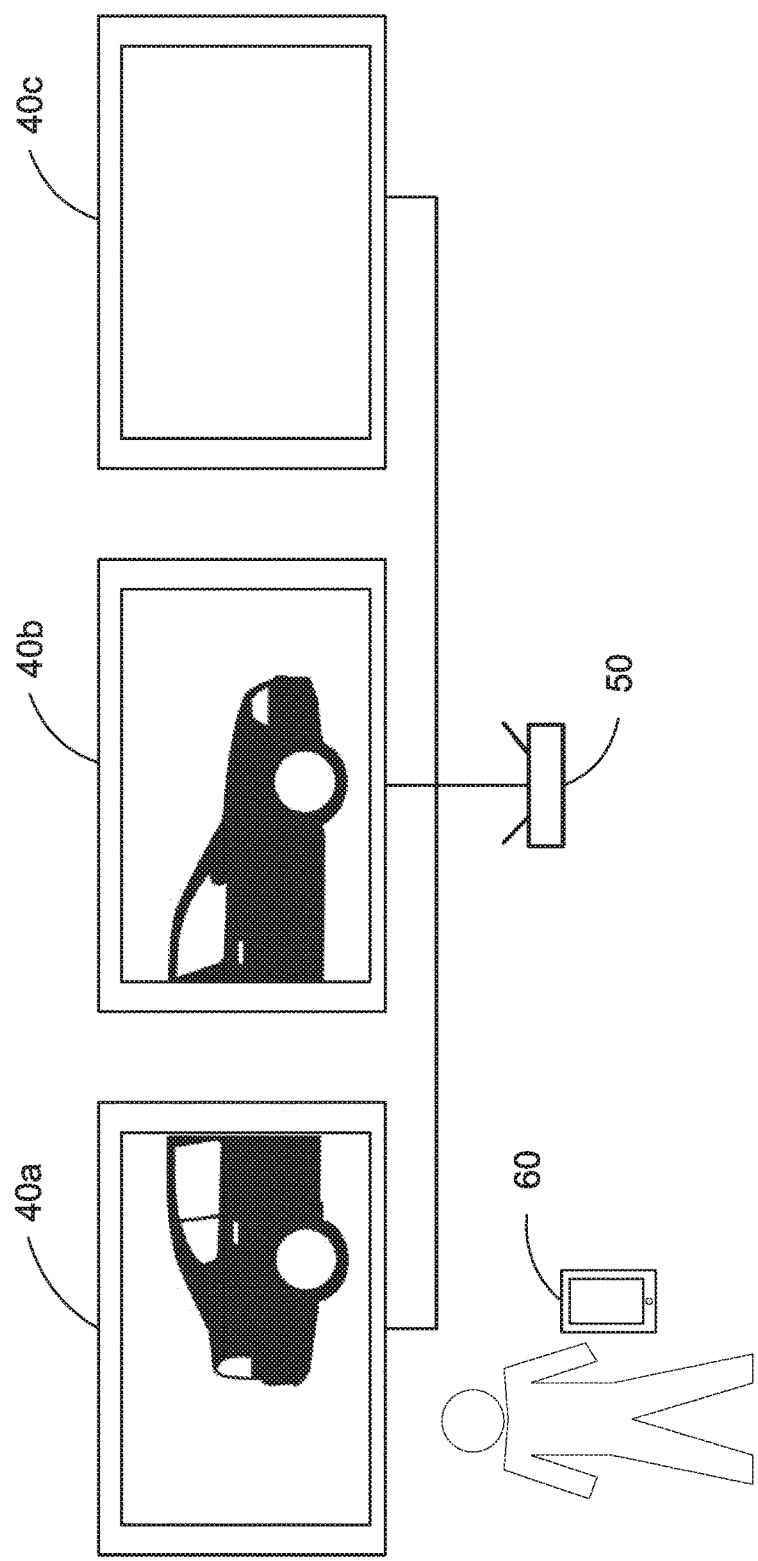
FIG. 2 provides a front plan view of an automatic video streaming system having three coplanar displays, in accordance with an embodiment of the present disclosure.

In particular embodiments, multiple displays may appear to interact with one another to display content streamed from a mobile device. FIG. 2 shows three displays 40*a-c* arranged next to each other. The three displays 40*a-c* are in communication with a control unit 50 via a cable or wireless communications. The control unit 50 is capable of communicating with a mobile device 60 to receive streamed content. Alternatively, the mobile device 60 may communicate individually with multiple nearby displays 40*a*-40*c* simultaneously.

When a mobile device 60 streams content to multiple displays 40*a-c* at the same time, the multiple displays 40*a-c* may display identical content (i.e., mirror each other), or may display different content. If the displays 40*a-c* display different content, they may display the content in a "complementary" manner such that it appears as if the displays 40*a-c* are acting in concert with one another. For example, a user's mobile device 60 may communicate with the control unit 50. This communication may indicate to the mobile device 60 that the control unit 50 is connected to three displays 40*a-c*. In FIG. 2, the user has chosen to share media content of a car traveling on a road. As the user walks past the first display 40*a* towards the second display 40*b*, the car might travel through the first display 40*a* and then into the second display

40*b*. The content that is displayed on display 40*b* "complements" or coordinates with what is shown on display 40*a*. It appears that the car is traveling through all three displays, and the impression is given that the three displays are interacting with one another. This "complementary" or connected effect may be carried out by the mobile device 60, the displays 40*a-c* and/or the control unit 50. Since the mobile device 60 and/or the control unit 50 know that there are three displays 40*a-c*, either device (or both together) can display the content (or a portion of the content) in a way that creates the intended effect of three displays acting as a single display.

Other scenes may be displayed on the multiple displays 40*a*-40*c*, such as a fight scene between two or more characters, a panoramic view (on top of a mountain, a city view with tall buildings, an underwater coral reef), etc. Rather than using video/moving content, a similar effect may also be achieved by a still image by taking a single image and dividing it among the three displays.

In certain embodiments, the movement of the content through the three displays may depend on the movement of the user. For example, the speed of the car may match the speed of movement of the user, such that if the user is walking slowly, the car will travel slowly through the displays 40*a-c* as the user walks past each display. If the user stops at a particular display, the car may also stop.

Alternatively, the content may be independent of the user's movement apart from the user's proximity to the displays which activates the displays. For example, if a user is near displays 40*a-c* such that they are activated to display the user's content, the animation of the car driving through may occur independently of the user's actual movement, e.g., the car zooms past the displays at the same speed regardless of the user's walking speed. The displays may stop displaying the content once the content has completed (e.g., after the car drives through). Alternatively, the displays may continue to display content (either the same or different content) until the user has walked past the displays and is out of range of the displays 40*a-c*.

Figure 3:
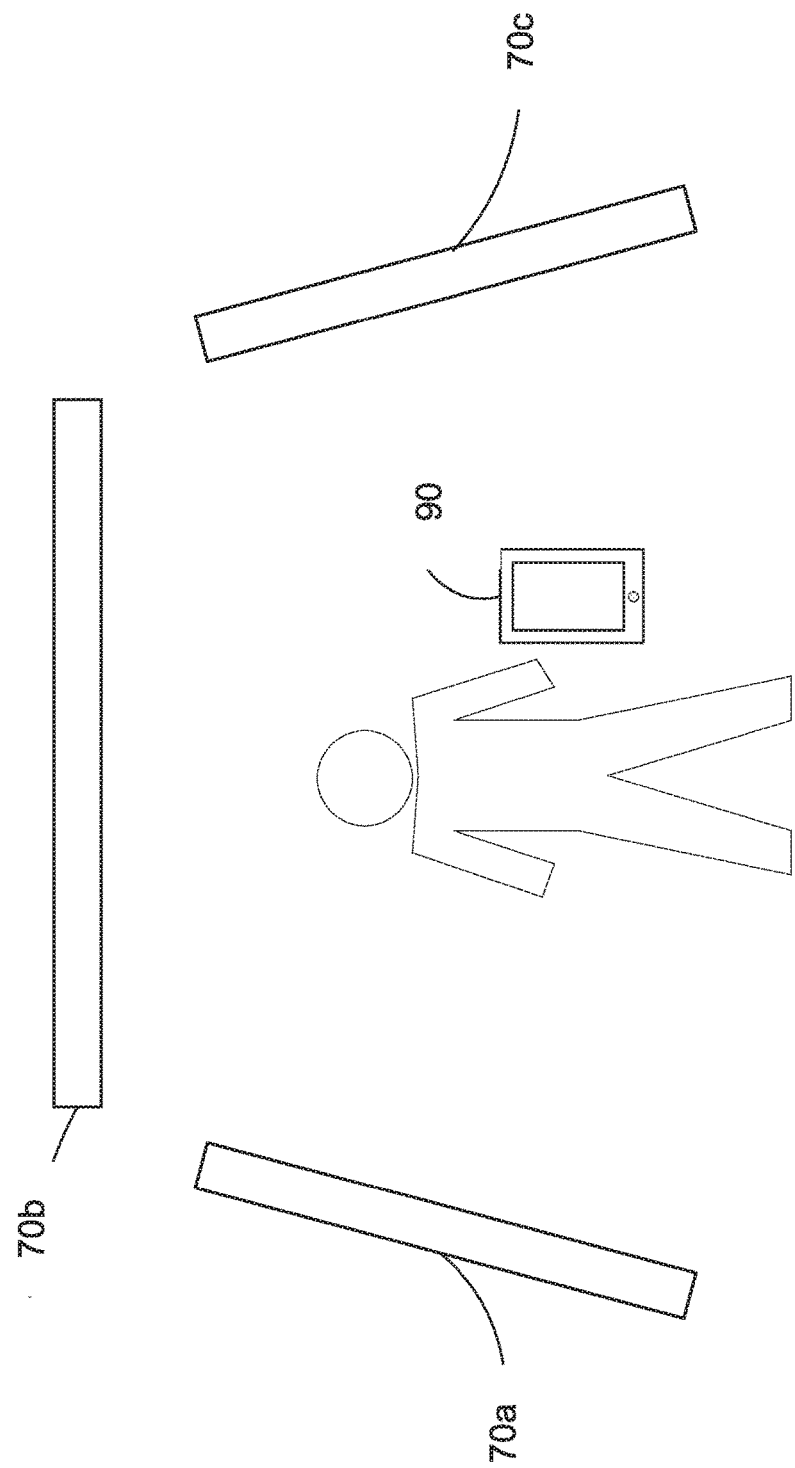
FIG. 3 provides a front plan view of an automatic video streaming system having three displays arranged in a three-dimensional arrangement, in accordance with an embodiment of the present disclosure.

FIG. 3 shows a top plan view of three displays 70*a-c* arranged in a three-dimensional arrangement with displays to the front (70*b*), left (70*a*), and right (70*c*) of a user having a mobile device 90. Like the displays 40*a-c* described with reference to FIG. 2, the three displays 70*a-c* may display content in a complementary manner that achieves the effect of the displays being connected or interacting. For example, the three displays might create a three dimensional scene in which the front display simulates a front view, the left display simulates a left view, and the right display simulates a right view, and elements at the edges of each display may connect with elements in adjacent displays. If sound is implemented on the displays 70*a-c* (or 40*a-c* of FIG. 2), stereo surround-sound might be implemented to give the effect of objects making sounds at different locations and sound "traveling" through the displays. For example, with the example of the car in FIG. 2, the sound of the car passing might travel from left to right with the car.

FIG. 2 was described such that multiple displays were able to display content in a complementary manner by connecting to a control unit. In alternative embodiments, displays may communicate with one another to accomplish the same purpose. For example, display 40*a* in FIG. 2 may interact with display 40*b*, and display 40*b* may interact with both displays 40*a* and 40*c*, so that they can display content in a complementary, connected manner (e.g., a car appearing to drive through one display into another). Any such communications may occur wirelessly or via a wired connection.

In yet another alternative embodiment, the mobile device 60 may detect the presence of multiple displays that the mobile device is streaming to, and may stream content to each display individually in a manner that makes it appear as if the displays are connected.

Figure 4:
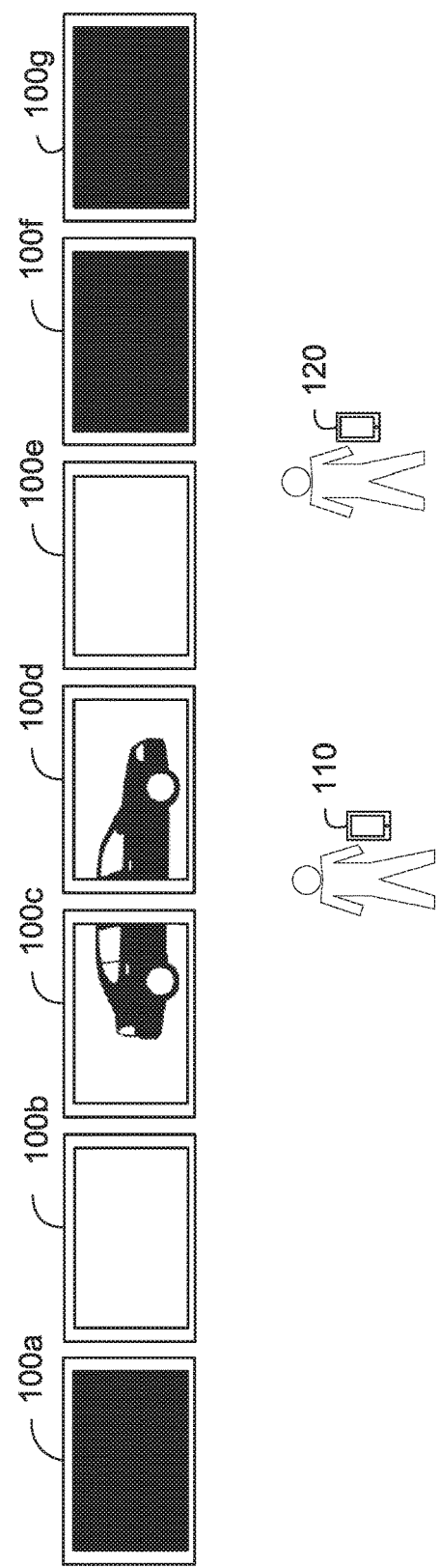
FIG. 4 provides a front plan view of an automatic video streaming system having numerous displays that may operate in a connected manner in accordance with an embodiment of the present disclosure.

On a larger scale, if a user is walking past numerous displays, it may be desirable for the "connected" effect to continue through all of those displays. FIG. 4 shows a situation in which 7 displays 100*a-g* are arranged in a row with a user having a mobile device 110 walking past. The effect of "connecting" these displays may be achieved, as discussed above, by connecting the displays 100*a-g* to a control unit that communicates with the mobile device. Alternatively, this may be achieved by having individual displays communicate with those adjacent or nearby to it (e.g., display 100*a* communicates with display 100*b*, and display 100*b* communicates with displays 100*a* and 100*c*, etc.). Or, similarly, adjacent or nearby control units connected to certain subsets of the displays may communicate with one another, or may communicate with the mobile device 110. For example, in FIG. 4, displays 100*a-c* may be connected to a first control unit, and displays 100*d-g* may be connected to a second control unit.

In yet another embodiment, the mobile device 110 may determine that there are multiple displays, and when a new adjacent display enters the mobile device 110's communication range for sharing, the mobile device 110 may send display instructions to all connected displays to continue the effect. For example, in FIG. 4, as the user approaches display 100*a*, only that display may be in range for sharing and communicating with the mobile device 110. Then, as the user walks past display 100*a*, display 100*b* may enter the mobile device 110's range and, sensing this new adjacent display, the mobile device 110 may activate the display 100*b* and cause the display 100*a* to continue its image into display 100*b*. As the user continues to walk forward, display 100*c* will enter the mobile device 100's range, while display 100*a* will fall out of range and turn off. This process can continue as the user continues walking forward. In FIG. 4, it can be seen that the user is currently walking past display 100*c* and is near display 100*d*. In this case, the user may be close enough to displays 100*b*, 100*c*, 100*d*, and 100*e* so that those displays are receiving content to display. At the same time, displays 100*f*, and 100*g* are out of range of the user's mobile device 110 and thus, are not receiving content to display, or possibly displaying a blank screen or some other content unrelated to the mobile device 110. Display 100*a*, which was previously receiving content, is now out of range of the mobile device 110, and, thus, is displaying nothing or displaying content unrelated to mobile device 110.

It can be appreciated that there may be situations in which a display is in proximity to more than one mobile device. In such situations, the display and/or the mobile devices may form a queue, and each mobile device's content is displayed in order based on order of first and second communication. Alternatively, content may be played from a randomly selected mobile device from a group of mobile devices that are in range.

In one embodiment, content from two mobile devices from two different users may be played simultaneously and "combined" or interact in some way, as shown in FIG. 4 (mobile device 120). For example, one user may have chosen to share a video of an object, such as a car or a character, moving through a scene, while another user may have chosen to share a scene or environment, e.g., image or video of a forest. If these two users are standing near a single display, the display may interpose the car video in the forest scene such that the car is driving through the forest. Other objects and environments may be used, such as two characters speaking, fighting, laughing, or otherwise interacting with each other. Users may be surprised by the unexpected results of the combinations of their shared content.

In one embodiment, a first user plays a video game on a mobile device, which has been configured to manually or automatically stream that video game to a display within a specific range of the mobile device. A second user with a mobile device within range of the display can join the game to play with the first user or against the first user.

Some media content assets may contain information (e.g., metadata) indicating that the asset is more amenable to being combined with one or more other types of content assets. Each mobile device and/or display may select content that is more readily combined with other content from other mobile devices. Combination of content may be performed by one or more mobile devices (e.g., collecting shared content from multiple mobile devices, combining them, and then transmitting the combined content to the display), or may be performed by the display (collecting shared content from the multiple mobile devices, combining them, and then displaying the combined content).

Figure 5:
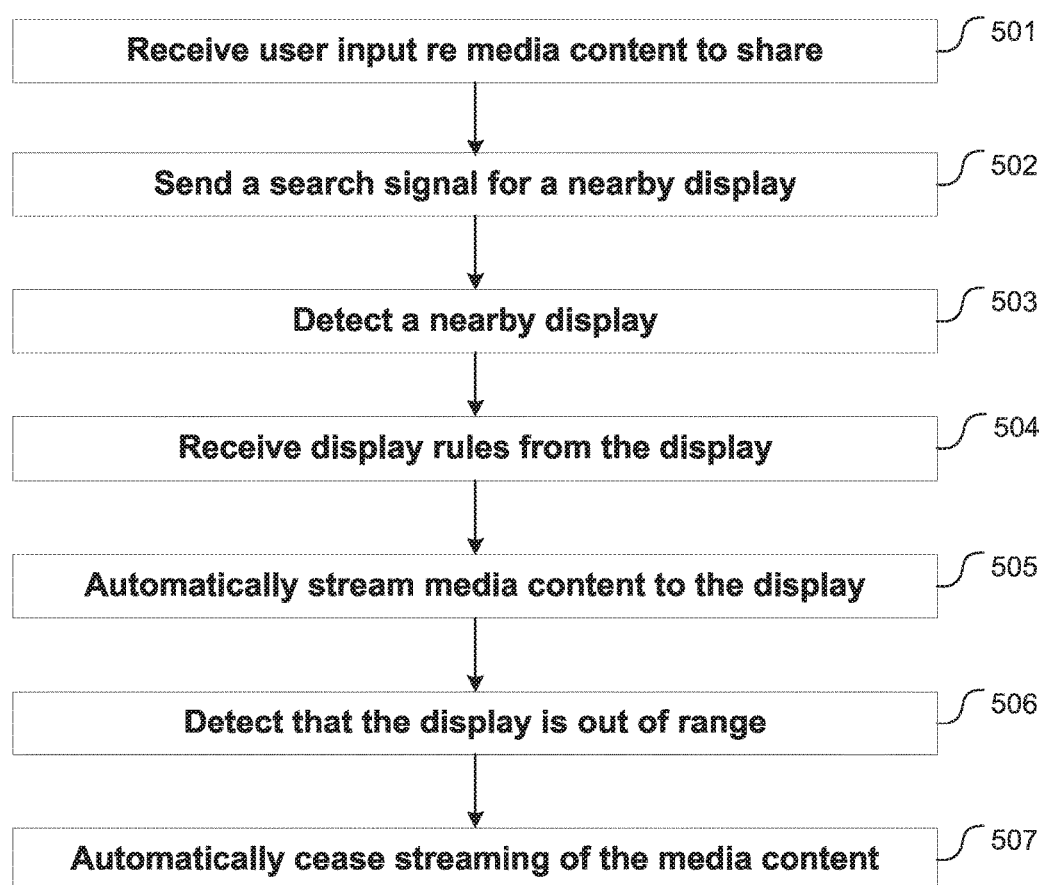
FIG. 5 provides a flow chart representation of a content streaming method in accordance with an embodiment of the present disclosure.

FIG. 5 provides a flow chart for an automatic mobile streaming method that may be implemented on a mobile device in accordance with an embodiment of the present disclosure. The method may begin with receiving user input to select one or more media content assets for sharing (501). The mobile device then sends a search signal for a nearby display (502). As discussed above, in certain embodiments, the mobile device may not send a search signal, and the search signal may be transmitted by displays, instead. A nearby display is then detected (503). The mobile device may then receive a set of display rules from the display, if any (504). Actions 503 and 504 may be combined. The mobile device then automatically streams media content to the display (505). If the display provided display rules, then media content may be selected that satisfies the display rules. The mobile device then detects that the display is out of range (506), and ceases streaming of the media content (507).

Figure 6:
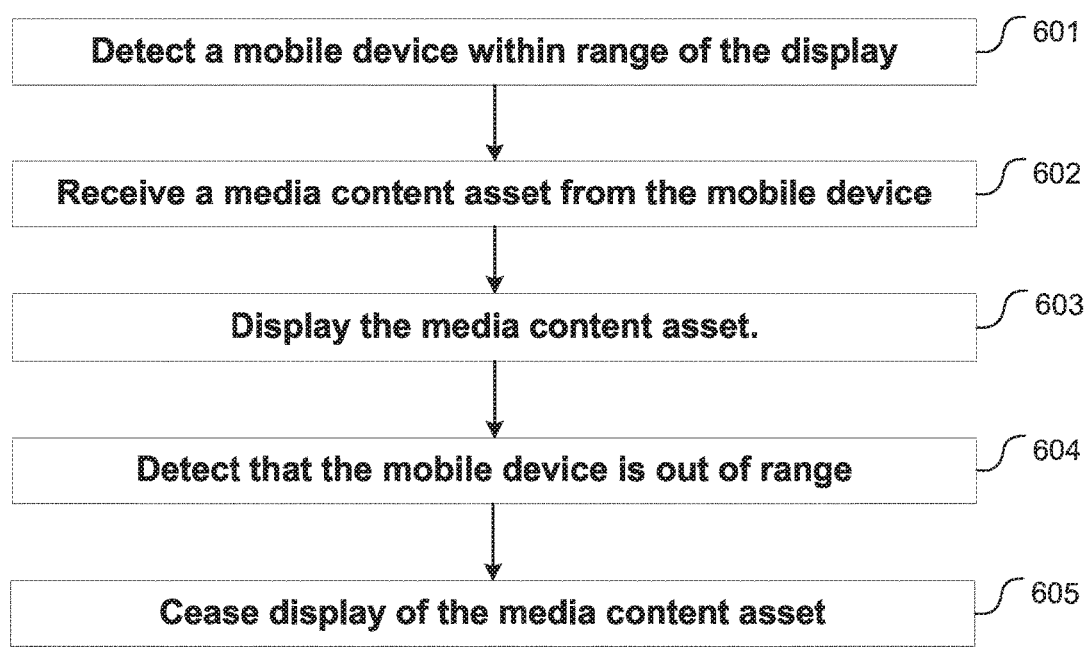
FIG. 6 provides a flow chart representation of a content display method in accordance with an embodiment of the present disclosure.

FIG. 6 provides a flow chart for an automatic mobile streaming display method that may be implemented on a display in accordance with an embodiment of the present disclosure. First, the display detects a mobile device within a proximity or range of the display (601). This may comprise detecting a mobile device within a pre-defined distance from the display. The mobile device detection may be the result of the display transmitting a search signal, or, alternatively, may be the result of a mobile device sending a search signal and requesting to connect to the display. The display then receives a media content asset from the mobile device (602) and displays the media content asset (603). The display then detects that the mobile device is out of range (604), and ceases display of the media content asset (605).

Figure 7:
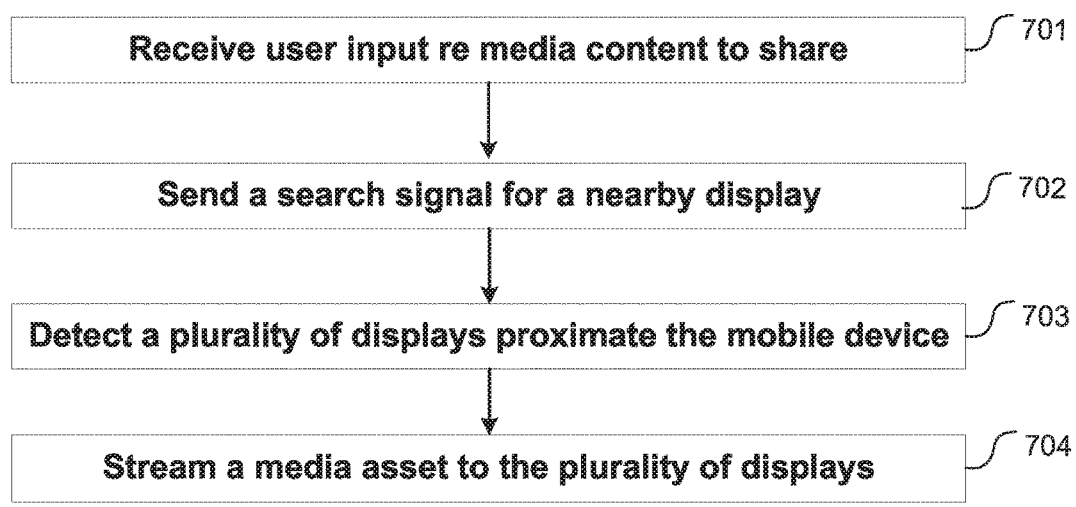
FIG. 7 provides a flow chart representation of a multiple display content streaming method in accordance with an embodiment of the present disclosure

FIG. 7 provides a flow chart for a method of automatic mobile streaming to multiple displays that may be implemented on a mobile device in accordance with an embodiment of the present disclosure. Similar to the method shown in FIG. 5, the mobile device receives user input selecting one or more media content assets for sharing (701) and sends a search signal for a nearby display (702). However, rather than detecting a single display, the mobile device detects multiple displays nearby (703), or a control unit that controls multiple displays. The mobile device then streams a media content asset to the plurality of displays (704). The displays may mirror each other so that they identically display the media content asset. Alternatively, the display may display the media content asset in such a way that it appears as if the multiple displays are acting as a single, common display (e.g., a car going from one display to another). The plurality of displays may be connected and/or in communication in some way such that they are pre-disposed to acting as a single, common display. Alternatively, the mobile device may independently make the determination to stream a media asset in such a way that the multiple displays act as a common display.

In one embodiment, the user has an online account to access a collection of digital movies. The user can use a mobile device to select one or more scenes, quotes, character profiles, etc. from one or more movies in the collection to share with nearby displays. Each movie can have pre-set scenes for users to select, or the user can select a scene by designating a starting point and an end point. For example, the user can select scene A from a first movie and scene B from a second movie to stream to a nearby display to play the scenes back-to-back one time, in a loop, or periodically.

When the user gets tired of seeing the same content again, the user can use the mobile device to change the content to be shared with nearby displays. The previously shared content may be saved in a group of favorite content, so the user can easily find that content on the mobile device user interface to share again in the future.

The user may download a software app onto a mobile device to implement some or all of the methods described herein.

In one embodiment, a display may be configured to switch from its existing input (e.g., cable, satellite, DVD, Blu-ray disc) to display the content streamed from a mobile device. A display may be capable of displaying the content streamed from a mobile device, but the owner of the display may deactivate this feature.

In one embodiment, a user can use a laptop or tablet computer to select content and change the settings shown in FIG. 9, which may have a larger display and be easier to use than a mobile device, and the mobile device will stream the selected content to nearby displays.

It should be understood that while the figures have presented exemplary embodiments of the present systems and methods, revisions may be made to the disclosed systems and methods without departing from the scope of the present disclosure.

Where components or modules of the disclosed systems and methods are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 8:
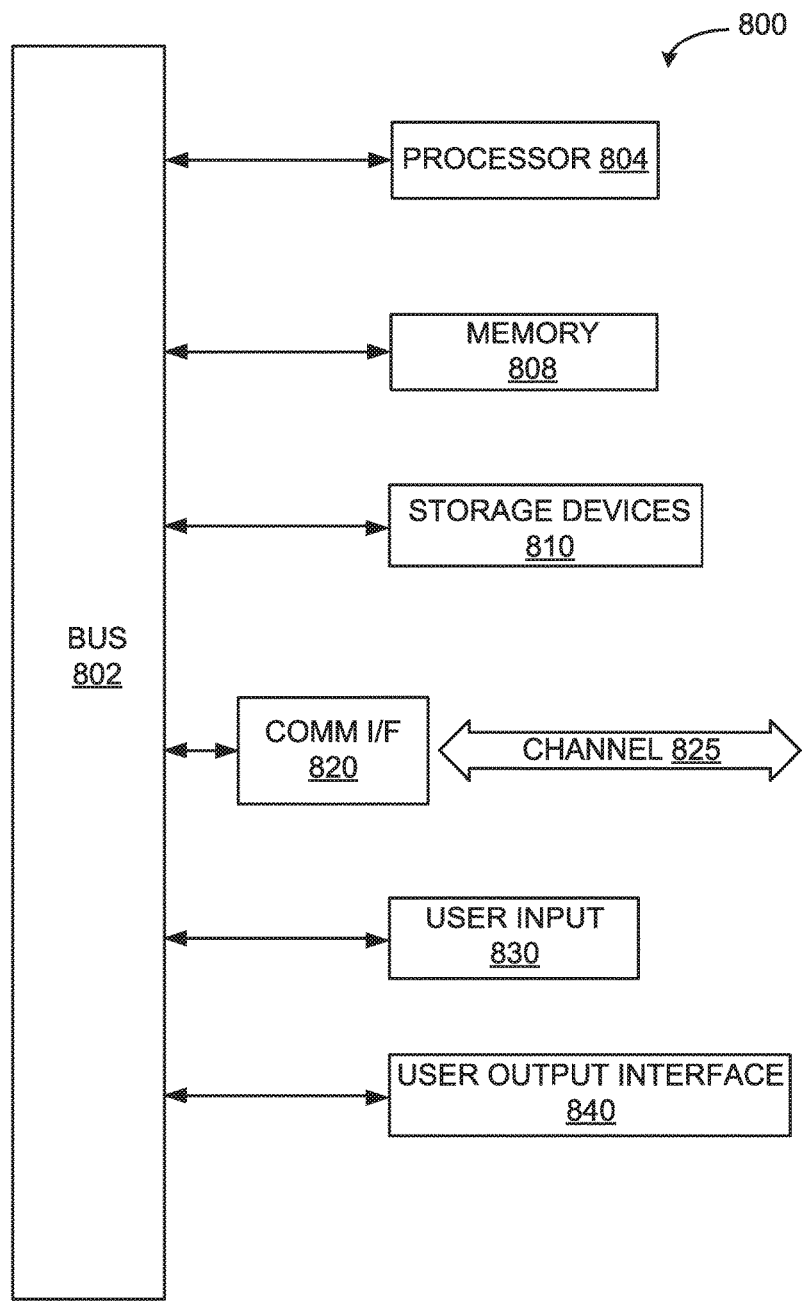
FIG. 8 illustrates a sample computing module that may be used to implement certain features and embodiments of the present disclosure.

Referring now to FIG. 8, computing module 800 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 800 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 800 or to communicate externally.

Computing module 800 might also include one or more memory modules, simply referred to herein as main memory 808. For example, random access memory (RAM) or other dynamic memory might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804. The computing module 800 might also include one or more various storage devices 810, which might include, for example, a magnetic tape drive, an optical disc drive, a solid state drive, removable storage media such as a CD or DVD, or any other non-volatile memory.

Computing module 800 might also include a communications interface 820. Communications interface 820 might be used to allow software and data to be transferred between computing module 800 and external devices. Examples of communications interface 820 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 820 might typically be carried on signals, which can be electronic, electromagnetic (which includes optical) or other signals capable of being exchanged by a given communications interface 820. These signals might be provided to communications interface 820 via a channel 825. This channel 825 might carry signals and might be implemented using a wired or wireless communication medium. Some examples of a channel might include a phone line, a cellular link, an RF link, an optical link, a network interface, a local or wide area network, and other wired or wireless communications channels.

Computing module 800 might also include one or more user inputs 830. The user input allows for the user to enter commands to the computing module 800 and interact with it. Examples of user inputs might include a computer mouse, a keyboard, a touch-sensitive screen, a stylus, a mousepad, a joystick, an accelerometer, a gyroscope, a camera, a remote control, or any other user input mechanism.

The computer module 800 might also include one or more user output interfaces 840. The user output interfaces 840 might be used to interact with the user by presenting information or sensory outputs for the user. Examples of user output interfaces might include visual outputs, such as a display screen or monitor, or audio outputs, such as a speaker or headphone output.

In this document, the terms "computer readable medium" and "computer usable medium" are used to generally refer to media such as, for example, memory 808, storage unit 810, and channel 825. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard,"

"known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:

1. A method at a display, the method comprising:
   detecting a mobile device within a proximity of the display;
   transmitting a display rule from the display to the mobile device;
   receiving a media content asset from the mobile device;
   displaying the media content asset on the display;
   ceasing display of the media content asset when the mobile device has moved out of the proximity;
   detecting a second mobile device within the proximity of the display;
   receiving on the display a second media content asset from the second mobile device; and
   receiving a time-based rule for sending user-selected content to the display within the proximity of the mobile device, such that a first set of media content assets is sent to the display during a first time period, and a second set of media content assets is sent to the display during a second time period.

2. The method of claim 1, wherein displaying the media content asset on the display comprises displaying a combination of the media content asset and the second media content asset on the display.

3. The method of claim 1, further comprising sending a search signal to determine whether there is a mobile device within a proximity of the display.

4. The method of claim 3, wherein sending a search signal to determine whether there is a mobile device within the proximity of the display further comprises:
   detecting movement of the mobile device,
   wherein the search signal is sent as a result of the detected movement of the mobile device.

5. The method of claim 3, wherein sending a search signal to determine whether there is a mobile device within the proximity of the display further comprises:
   detecting that the mobile device has stopped moving for a period of time,
   wherein the search signal is sent as a result of detecting that the mobile device has stopped moving for a period of time.

6. The method of claim 1, wherein the display rule comprises a content restriction that limits a media content asset that may be displayed on the display.

7. The method of claim 1, further comprising checking the media content asset for compliance with the content restriction.

8. The method of claim 7, wherein displaying the media content asset on the display occurs only if the media content asset complies with the content restriction.

9. The method of claim 1, wherein the display rule comprises a maximum mobile device distance.

10. A method at a mobile device, the method comprising:
    detecting a display within a proximity of the mobile device;
    receiving a display rule from the display at the mobile device;
    transmitting a media content asset from the mobile device to the display;
    detecting a second display within the proximity of the mobile device;
    transmitting at least a portion of the media content asset from the mobile device to the second display; and
    receiving a time-based rule for sending user-selected content to the display within the proximity of the mobile device, such that a first set of media content assets is sent to the display during a first time period, and a second set of media content assets is sent to the display during a second time period.

11. The method of claim 10, wherein detecting a display within a proximity of the mobile device comprises sending a search signal to determine whether there is a display within a proximity of the mobile device.

12. The method of claim 10, further comprising streaming the media content asset such that the display and the second display act as a single, connected display.

13. The method of claim 10, further comprising selecting the media content asset from a digital media library associated with a user of the mobile device.

14. The method of claim 10, further comprising receiving a user input to control an audio signal of the selected media content asset when the media content asset is played on the display.

15. A non-transitory computer-readable medium comprising an instruction set configured to cause a computing device to perform:
    detecting a display within a proximity of the computing device;
    receiving a display rule from the display at the computing device;
    transmitting a media content asset from the computing device to the display;
    detecting a second display within the proximity of the computing device;
    transmitting at least a portion of the media content asset from the computing device to the second display; and
    receiving a time-based rule for sending user-selected content to the display within the proximity of the computing device, such that a first set of media content assets is sent to the display during a first time period, and a second set of media content assets is sent to the display during a second time period.

16. The non-transitory computer-readable medium of claim 15, wherein detecting a display within a proximity of the computing device comprises sending a search signal to determine whether there is a display within a proximity of the computing device.

17. The non-transitory computer-readable medium of claim 15, further comprising streaming the media content asset such that the display and the second display act as a single, connected display.

18. The non-transitory computer-readable medium of claim 15, further comprising selecting the media content asset from a digital media library associated with a user of the computing device.

19. The non-transitory computer-readable medium of claim 15, further comprising receiving a user input to control an audio signal of the selected media content asset when the media content asset is played on the display.

20. The non-transitory computer-readable medium of claim 15, further comprising receiving a user input to control an audio signal of the selected media content asset when the media content asset is played on the second display.

\* \* \* \* \*